United States Patent
Nishimura et al.

(10) Patent No.: US 10,278,007 B2
(45) Date of Patent: Apr. 30, 2019

(54) INFORMATION PROVIDING SYSTEM AND INFORMATION PROVIDING METHOD

(71) Applicants: Tatsuo Nishimura, Tokyo (JP); Hiroshi Kato, Kanagawa (JP)

(72) Inventors: Tatsuo Nishimura, Tokyo (JP); Hiroshi Kato, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 15/666,363

(22) Filed: Aug. 1, 2017

(65) Prior Publication Data

US 2017/0332194 A1 Nov. 16, 2017

Related U.S. Application Data

(62) Division of application No. 15/066,825, filed on Mar. 10, 2016, now Pat. No. 9,749,785.

(30) Foreign Application Priority Data

Mar. 20, 2015 (JP) ................. 2015-058765

(51) Int. Cl.
*G06K 19/00* (2006.01)
*H04W 4/02* (2018.01)
*H04W 4/04* (2009.01)

(52) U.S. Cl.
CPC ............ *H04W 4/02* (2013.01); *H04W 4/04* (2013.01)

(58) Field of Classification Search
USPC ................... 235/435, 439, 454, 462
See application file for complete search history.

(56) References Cited

U.S. PATENT DOCUMENTS

2009/0103114 A1 4/2009 Nishimura
2010/0046044 A1 2/2010 Ishizu et al.
(Continued)

FOREIGN PATENT DOCUMENTS

JP  09-018394 A   1/1997
JP  4312642 B2   5/2009
(Continued)

*Primary Examiner* — Matthew Mikels
(74) *Attorney, Agent, or Firm* — Oblon, McClelland, Maier & Neustadt, L.L.P.

(57) ABSTRACT

A portable terminal obtains a first code used to obtain provision information and a second code, different from the first code, from a communication device. The portable terminal transmits the first and second codes to an information processing device, receives the provision information from the information processing device as a response to the transmission, and outputs the received provision information. The information processing device includes a first storage unit storing the first code and a second storage unit storing, by associating, the second code and the provision information. The information processing device receives the first and second codes from the portable terminal, obtains provision information associated with the received second code from the second storage unit when the received first code is stored in the first storage unit, and transmits the obtained provision information to the portable terminal. The first code is deleted in exiting from a specific area.

6 Claims, 10 Drawing Sheets

(56) References Cited

U.S. PATENT DOCUMENTS

| | | |
|---|---|---|
| 2011/0065451 A1* | 3/2011 | Danado ............ H04M 1/72569 455/456.1 |
| 2011/0202913 A1 | 8/2011 | Nishimura |
| 2013/0159841 A1 | 6/2013 | Yokoyama et al. |
| 2013/0268624 A1 | 10/2013 | Yagiura |
| 2015/0271353 A1 | 9/2015 | Nishimura et al. |
| 2015/0293728 A1 | 10/2015 | Nishimura et al. |
| 2015/0341441 A1 | 11/2015 | Saitoh et al. |

FOREIGN PATENT DOCUMENTS

| | | |
|---|---|---|
| JP | 2011-205485 A | 10/2011 |
| JP | 2013-218503 A | 10/2013 |
| JP | 2014-067254 A | 4/2014 |

* cited by examiner

FIG.5

| FIRST ACCESS CODE |
|---|
| 1AC001 |
| 1AC002 |
| 1AC003 |
| ⋮ |

FIG.6

| COMMUNICATION DEVICE NAME | SECOND ACCESS CODE | PROVISION INFORMATION | POSITIONAL INFORMATION |
|---|---|---|---|
| Bt001 | 2AC001 | AUDIO INFORMATION (EXHIBITION ARTICLE A) | (X, X) |
| Bt002 | 2AC002 | TEXTUAL INFORMATION (EXHIBITION ARTICLE B) | (Y, Y) |
| Bt003 | 2AC003 | AUDIO INFORMATION + TEXTUAL INFORMATION (EXHIBITION ARTICLE C) | (Z, Z) |
| ⋮ | ⋮ | ⋮ | ⋮ |

FIG.11

| PROVISION INFORMATION | VENUE POSITION | START TIME | END TIME | NOTIFI-CATION TIME | NOTIFICATION METHOD | NOTIFI-CATION TARGET |
|---|---|---|---|---|---|---|
| AUDIO INFORMATION (EVENT A) | (A, A) | 10:00 | 12:00 | 9:30 | | Bt001, Bt003 |
| AUDIO INFORMATION + TEXTUAL INFORMATION (EVENT B) | (B, B) | 11:00 | 12:30 | 10:45 | | Bt002 |
| AUDIO INFORMATION (EVENT C) | (C, C) | 12:00 | 13:00 | | EVERY 10 MINUTES FROM ONE HOUR BEFORE START TIME | Bt001, Bt004 |
| ⋮ | ⋮ | ⋮ | ⋮ | ⋮ | ⋮ | ⋮ |

| USER INFORMATION | FIRST ACCESS CODE | SECOND ACCESS CODE | ACCESS POINT |
|---|---|---|---|
| USER A | 1AC001 | 2AC001 | Bt001, Bt002 |
| USER B | 1AC002 | 2AC002 | Bt002, Bt004 |
| USER C | 1AC003 | 2AC003 | Bt003, Bt001 |
| ⋮ | ⋮ | ⋮ | ⋮ |

INFORMATION PROVIDING SYSTEM AND INFORMATION PROVIDING METHOD

CROSS-REFERENCE TO RELATED APPLICATION

The present application is a divisional of U.S. application Ser. No. 15/066,825 filed Mar. 10, 2016 and claims priority to and incorporates by reference the entire contents of Japanese Patent Application No. 2015-058765 filed in Japan on Mar. 20, 2015.

BACKGROUND OF THE INVENTION

1. Field of the Invention

The present invention relates to an information providing system and an information providing method.

2. Description of the Related Art

Conventionally in an exhibition hall such as a museum and an aquarium, a method of providing information concerning an exhibition hall by causing a portable terminal carried by a user to read an QR Code® has been known.

It is preferable that information concerning an exhibition hall be only available while a user stays in the exhibition hall. However, the conventional technique is not intended such that the information is available only in the period during which the user stays in the exhibition hall.

Therefore, there is a need for an information providing system and an information providing method capable of making provision information available only while a user stays in a specific area such as an exhibition hall.

SUMMARY OF THE INVENTION

It is an object of the present invention to at least partially solve the problems in the conventional technology.

According to an embodiment, there is provided an information providing system that includes a portable terminal; and an information processing device. The portable terminal includes a first obtaining unit configured to obtain a first code used to obtain provision information; a second obtaining unit configured to obtain a second code different from the first code from a communication device arranged in a specific area; a code transmitting unit configured to transmit the first code and the second code to the information processing device; a provision information receiving unit configured to receive the provision information from the information processing device as a response to the transmission of the first code and the second code; and a provision information output unit configured to output the received provision information. The information processing device includes a first storage unit configured to store the first code; a second storage unit configured to store the second code and the provision information in association with each other; a first receiving unit configured to receive the first code and the second code from the portable terminal; a first determining unit configured to determine whether the first code received from the portable terminal is stored in the first storage unit; and a provision information transmitting unit configured to obtain provision information associated with the second code received from the portable terminal from the second storage unit when the first code is determined to be stored in the first storage unit, and to transmit the obtained provision information to the portable terminal. The first code is deleted in exiting from the specific area.

According to another embodiment, there is provided an information providing method to be executed in an information providing system including a portable terminal and an information processing device. The information providing method includes obtaining, by the portable terminal, a first code used to obtain provision information; obtaining, by the portable terminal, a second code different from the first code from a communication device arranged in a specific area; transmitting, by the portable terminal, the first code and the second code to the information processing device; receiving, by the portable terminal, the provision information from the information processing device as a response to the transmission of the first code and the second code; outputting, by the portable terminal, the received provision information, the information processing device including a first storage unit configured to store the first code and a second storage unit configured to store the second code and the provision information in association with each other; receiving, by the information processing device, the first code and the second code from the portable terminal; determining, by the information processing device, whether the first code received from the portable terminal is stored in the first storage unit; obtaining, by the information processing device, provision information associated with the second code received from the portable terminal from the second storage unit when the first code is determined to be stored in the first storage unit; and transmitting, by the information processing device, the obtained provision information to the portable terminal, the first code being deleted in exiting from the specific area.

According to still another embodiment, there is provided an information providing system that includes a portable terminal; and an information processing device. The information providing system executes a program causing the portable terminal to perform: obtaining a first code used to obtain provision information; obtaining a second code different from the first code from a communication device arranged in a specific area; transmitting the first code and the second code to the information processing device; receiving the provision information from the information processing device as a response to the transmission of the first code and the second code; and outputting the received provision information. The information processing device includes a first storage unit configured to store the first code; a second storage unit configured to store the second code and the provision information in association with each other; a first receiving unit configured to receive the first code and the second code from the portable terminal; a first determining unit configured to determine whether the first code received from the portable terminal is stored in the first storage unit; and a provision information transmitting unit configured to obtain provision information associated with the second code received from the portable terminal from the second storage unit when the first code is determined to be stored in the first storage unit, and to transmit the obtained provision information to the portable terminal. The first code is deleted in exiting from the specific area.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 illustrates an example of information stored in a first storage unit according to the first embodiment;

FIG. 6 illustrates an example of information stored in a second storage unit according to the first embodiment;

FIG. 11 illustrates an example of information stored in a third storage unit according to a third embodiment;

DETAILED DESCRIPTION OF THE PREFERRED EMBODIMENTS

Exemplary embodiments of an information providing system and an information providing method according to the present invention will be explained below with reference to the accompanying drawings. The present invention is not limited to the embodiments below. Besides, the embodiments can be arbitrarily combined within a scope not causing inconsistency in contents.

First Embodiment

System Configuration According to First Embodiment

Figure 1:
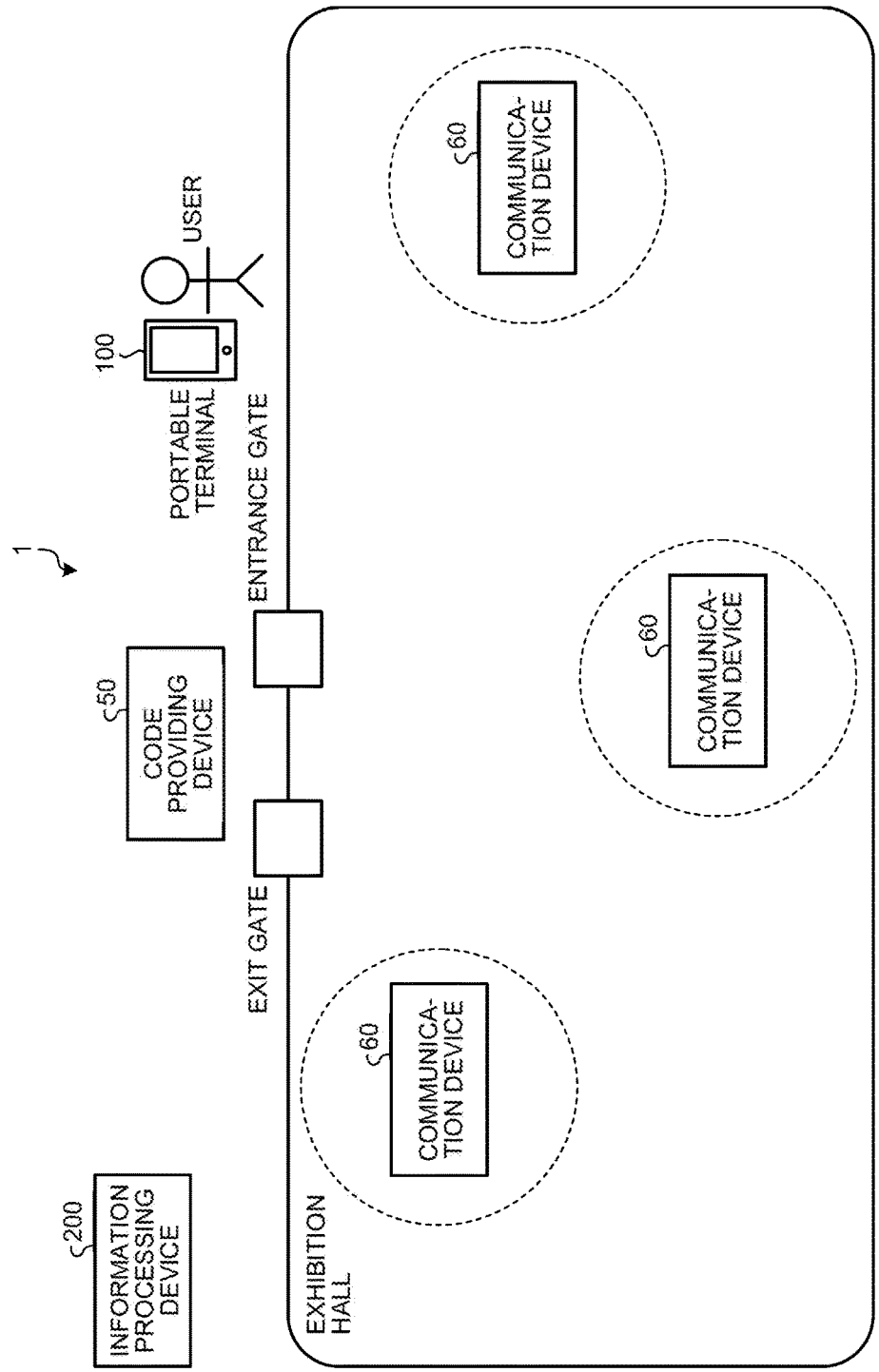
FIG. 1 illustrates an example of a configuration of an information providing system according to a first embodiment.

A configuration of an information providing system according to a first embodiment will be explained with reference to FIG. 1. FIG. 1 illustrates an example of a configuration of an information providing system according to the first embodiment.

As illustrated in FIG. 1, an information providing system 1 is provided with a code providing device 50, communication devices 60, a portable terminal 100, and an information processing device 200. The number of each of those devices is not limited to what is illustrated. The information providing system 1 is used in an exhibition hall such as a museum and an aquarium. A user who visits an exhibition hall carries the portable terminal 100. In the exhibition hall, the communication device 60 is arranged. An exhibition article is assumed to be present at a place where the communication device 60 is arranged. A range surrounded by a dash line around the communication device 60 indicates a valid area of a wireless communication such as the Bluetooth®.

The code providing device 50 is arranged in a vicinity of an entrance gate of the exhibition hall and receives a payment of an admission fee, a selection on whether to receive provision information, and the like. When receiving a selection of receiving provision information, the code providing device 50 displays an information-embedded pattern including a first access code that allows obtaining the provision information. For example, the information-embedded pattern is a QR Code® and the like.

The user carrying the portable terminal 100 uses the portable terminal 100 to image the information-embedded pattern. The portable terminal 100 is a terminal device such as a smart phone and a tablet terminal. The portable terminal 100 obtains the first access code by the imaging of the information-embedded pattern. The user enters the exhibition hall via an entrance gate after the image capturing of the information-embedded pattern. The code providing device 50 transmits, to the information processing device 200, the first access code included in the displayed information-embedded pattern. The information processing device 200 thus registers the first access code in a storage unit.

The user who enters the exhibition hall moves to a place where an exhibition article is present. At a place where an exhibition article is present, the communication device 60 is arranged. When the portable terminal 100 comes within a communication range of the communication device 60, the communication device 60 transmits a second access code, which is different from the first access code, to the portable terminal 100. When receiving the second access code, the portable terminal 100 transmits, to the information processing device 200, the first access code obtained via the image capturing of the information-embedded pattern and the second access code received from the communication device 60. The portable terminal 100 transmits the first access code and the second access code to the information processing device 200 based on address information, obtained in the image capturing of the information-embedded pattern together with the first access code, of the information processing device 200.

The information processing device 200 is an information device such as a personal computer (PC) or a server device. The information processing device 200 stores the first access code transmitted by the code providing device 50 and stores in advance second access codes and pieces of provision information corresponding to the respective second access codes. When receiving the first access code and the second access code from the portable terminal 100, the information processing device 200 determines whether or not the received first access code is registered in the storage unit. When the first access code is registered in the storage unit, the information processing device 200 obtains the provision information which is associated with the second access code from the storage unit. The information processing device 200 then transmits the obtained provision information to the portable terminal 100.

When receiving the provision information form the information processing device 200, the portable terminal 100 outputs the provision information to a display unit and the like. In this manner, whenever the portable terminal 100 comes within the communication range of the communication device 60, provision information concerning each article is provided. The user then exits the exhibition hall. In exiting, the user uses the portable terminal 100 to capture an image of an information-embedded pattern displayed in a display device arranged in a vicinity of an exit gate. This information-embedded pattern includes information that invalidates the first access code. The portable terminal 100 deletes the first access code from the portable terminal 100 in response to the image capturing of the information-embedded pattern including the information that invalidates the first access code.

The first access code obtained in entering the exhibition hall and the second access code obtained from the communication device 60 arranged in the vicinity of an exhibition article are transmitted from the portable terminal 100 to the information processing device 200, so that the provision information concerning each exhibition article is provided in the information providing system 1. The information that invalidates the first access code is then obtained in exiting the exhibition hall, so that the first access code is deleted from the portable terminal 100 in the information providing system 1. As a result of this, it is possible in the information providing system 1 to make the information concerning the exhibition hall available only while the user stays in the exhibition hall.

Hardware Configuration of Portable Terminal According to First Embodiment

Figure 2:
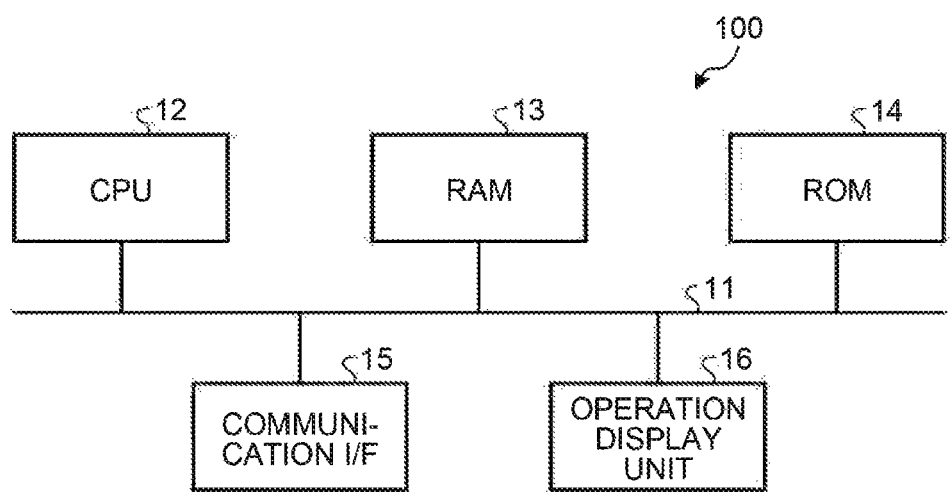
FIG. 2 is a block diagram of an example of a hardware configuration of a portable terminal according to the first embodiment.

Next, a hardware configuration of the portable terminal 100 according to the first embodiment will be explained with reference to FIG. 2. FIG. 2 is a block diagram of an example of a hardware configuration of the portable terminal 100 according to the first embodiment.

As illustrated in FIG. 2, the portable terminal 100 is provided with a CPU (central Processing Unit) 12, a RAM (Random Access Memory) 13, a ROM (Read Only Memory) 14, a communication I/F 15, and an operation display unit 16.

Those units are connected via a bus 11.

The CPU 12 controls an entire operation of the portable terminal 100. The CPU 12 uses the RAM 13 and the like as a work area and executes programs stored in the ROM 14 and the like to control the entire operation of the portable terminal 100. The RAM 13 is a work area in an execution of the programs stored in the ROM 14 and the like. The ROM 14 stores programs that enable realizing processes by the portable terminal 100. The communication I/F 15 is an interface that controls a communication with each unit. The operation display unit 16 receives inputs of various kinds depending on operations by a user and displays information of various kinds depending on the operations by the user. The operation display unit 16 is, for example, an LCD (Liquid Crystal Display) device equipped with a touch-sensitive panel function, an organic EL (Electro Luminescence) display device, and the like.

Figure 3:
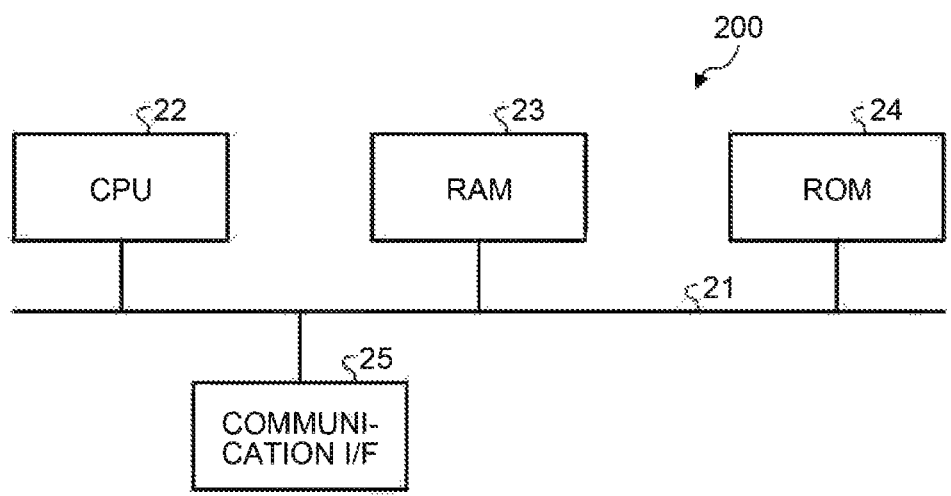
FIG. 3 is a block diagram of an example of a hardware configuration of an information processing device according to the first embodiment.

Hardware Configuration of Information Processing Device According to First Embodiment Next, a hardware configuration of the information processing device 200 according to the first embodiment will be explained with reference to FIG. 3. FIG. 3 is a block diagram of an example of a hardware configuration of the information processing device 200 according to the first embodiment.

As illustrated in FIG. 3, the information processing device 200 is provided with a CPU 22, a RAM 23, a ROM 24, and a communication I/F 25. Those units are connected via a bus 21.

The CPU 22 controls an entire operation of the information processing device 200. The CPU 22 uses the RAM 23 and the like as a work area and executes programs stored in the ROM 24 and the like to control the entire operation of the information processing device 200. The RAM 23 is a work area in an execution of the programs stored in the ROM 24 and the like. The ROM 24 stores programs that enable realizing processes by the information processing device 200. The communication I/F 25 is an interface that controls a communication with each unit.

Functional Configuration of Each Unit According to First Embodiment

Figure 4:
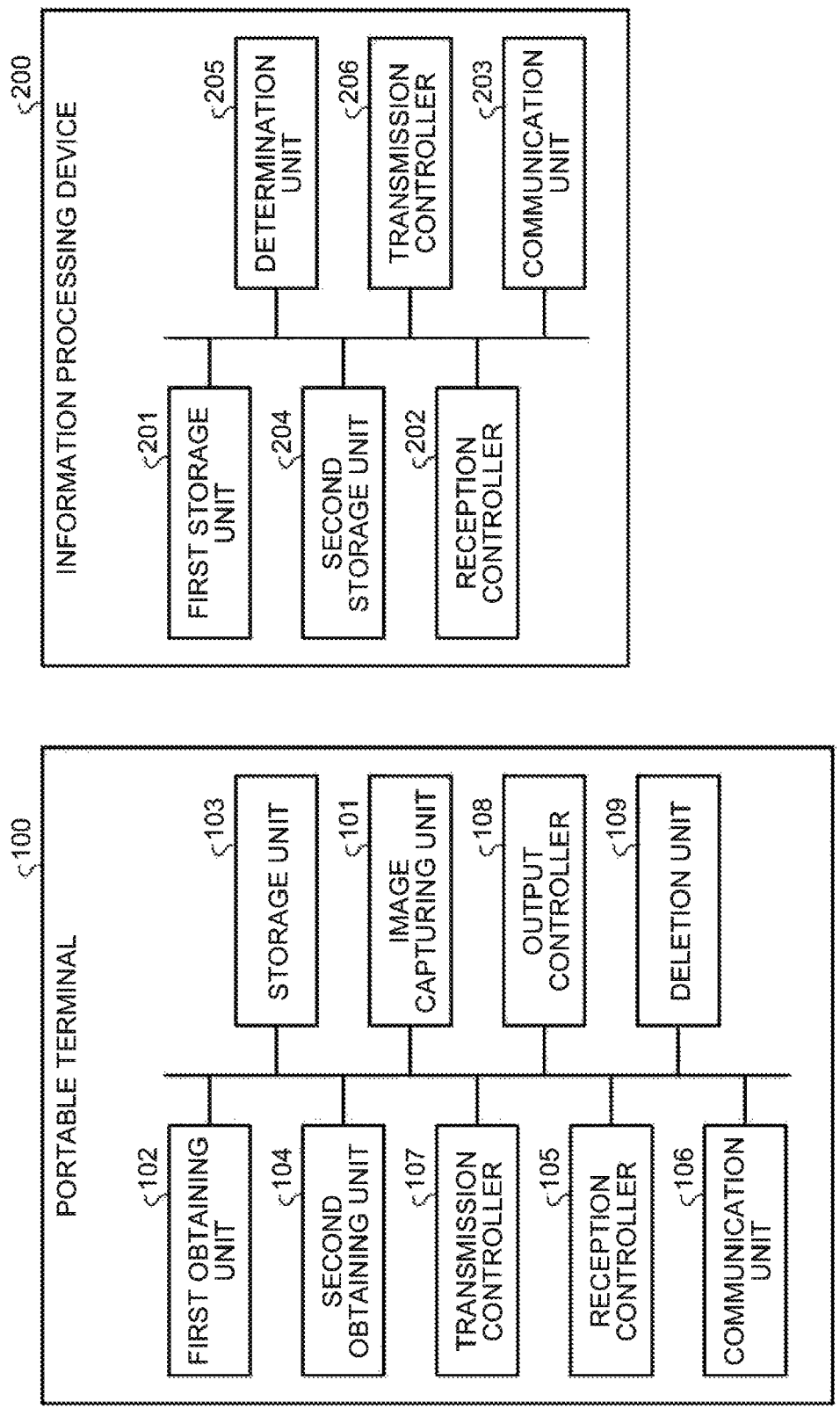
FIG. 4 is a block diagram of an example of a functional configuration of the portable terminal and the information processing device according to the first embodiment.

Next, a functional configuration of the portable terminal 100 and the information processing device 200 according to the first embodiment will be explained with reference to FIG. 4. FIG. 4 is a block diagram of an example of a functional configuration of the portable terminal 100 and the information processing device 200 according to the first embodiment.

As illustrated in FIG. 4, the portable terminal 100 is provided with an image capturing unit 101, a first obtaining unit 102, a storage unit 103, a second obtaining unit 104, a reception controller 105, a communication unit 106, a transmission controller 107, an output controller 108, and a deletion unit 109. A part or all of the first obtaining unit 102, the second obtaining unit 104, the reception controller 105, the transmission controller 107, the output controller 108, and the deletion unit 109 may be realized by software (program) or realized by hardware.

The image capturing unit 101 captures an image of an information-embedded pattern. For example, the image capturing unit 101 captures an image of an information-embedded pattern including the first access code that allows obtaining provision information as information concerning the exhibition hall, an address for a communication with the information processing device 200, and the like. The information-embedded pattern is a QR Code® and the like. The user uses the portable terminal 100 to image the QR Code® displayed in the code providing device 50 and the like arranged in the vicinity of the entrance gate of the exhibition hall. On this occasion, the code providing device 50 transmits the first access code included in the displayed QR Code® to the information processing device 200.

The image capturing unit 101 captures an image of a QR Code® including information that invalidates the first access code. The user uses the portable terminal 100 to image the QR Code® displayed in the display device and the like arranged in the vicinity of the exit gate of the exhibition hall. In other words, the user uses the portable terminal 100 to image QR Code® in entering and exiting the exhibition hall.

The first obtaining unit 102 obtains the first access code. For example, the first obtaining unit 102 obtains the first access code, an address of the information processing device 200, and the like in response to the image capturing of the QR Code® by the image capturing unit 101. The first obtaining unit 102 then stores the obtained first access code in the storage unit 103. After this, the portable terminal 100 uses the first access code stored in the storage unit 103 to execute a processing for obtaining provision information.

The second obtaining unit 104 obtains the second access code, which is different from the first access code, from the communication device 60 arranged in a specific area like the exhibition hall. For example, when the portable terminal 100 comes within the communication range of the communication device 60 arranged in the vicinity of an exhibition article, the second obtaining unit 104 obtains the second access code transmitted by the communication device 60. The second access code is obtained by being received from the communication device 60 via the communication unit 106 in accordance with the control by the reception controller 105.

The transmission controller 107 transmits the first access code and the second access code to the information processing device 200. The transmission controller 107 is an example of a "code transmitting unit". For example, the transmission controller 107 transmits the first access code obtained by the first obtaining unit 102 and the second access code obtained by the second obtaining unit 104 to the information processing device 200 via the communication unit 106 in accordance with the address of the information processing device 200 obtained by the first obtaining unit 102.

The reception controller 105 receives provision information from the information processing device 200. The reception controller 105 is an example of a "provision information receiving unit". For example, the reception controller 105 receives, from the information processing device 200 via the communication unit 106, provision information concerning an exhibition article in the vicinity of the place where the communication device 60 from which the second access code is obtained is arranged as a response to the transmission of the first access code and the second access code by the transmission controller 107.

The output controller 108 performs a control of outputting provision information. The output controller 108 is an example of a "provision information output unit".

For example, the output controller 108 displays the provision information received by the reception controller 105 in a display unit (the operation display unit 16 and the like, for example) to notify the user. The provision information is audio information, video information, textual information, and the like.

The deletion unit 109 deletes the first access code from the portable terminal 100. The deletion unit 109 is an example of a "terminal code deleting unit". For example, the deletion unit 109 deletes the first access code stored in the storage unit 103 in response to the image capturing, by the image capturing unit 101, of the QR Code® and the like including information that invalidates the first access code. The processing of deleting the first access code by the deletion unit 109 is executed by the image capturing of the QR Code® displayed in the display device and the like arranged in the vicinity of the exit gate of the exhibition hall.

As illustrated in FIG. 4, the information processing device 200 is provided with a first storage unit 201, a reception controller 202, a communication unit 203, a second storage unit 204, a determination unit 205, and a transmission controller 206. A part or all of the reception controller 202, the determination unit 205, and the transmission controller 206 may be realized by software (program) or by a hardware circuit.

The first storage unit 201 stores the first access code. The reception controller 202 receives the first access code from the code providing device 50 via the communication unit 203 and stores the received access code in the first storage unit 201. FIG. 5 illustrates an example of information stored in the first storage unit 201 according to the first embodiment. As illustrated in FIG. 5, the first storage unit 201 stores information of the first access code. To cite an instance, the first storage unit 201 stores a first access code "1AC001".

The second storage unit 204 stores, by associating, the second access code and the provision information. FIG. 6 illustrates an example of information stored in the second storage unit 204 according to the first embodiment. As illustrated in FIG. 6, the second storage unit 204 stores, by associating with each other, a communication device name of the communication device 60 that provides the second access code, the second access code, the provision information, and positional information of the communication device 60. To cite an instance, the second storage unit 204 stores, by associating, a communication device name "Bt001", a second access code "2AC001", provision information "AUDIO INFORMATION (EXHIBITION ARTICLE A)", and positional information "(X, X)".

The reception controller 202 performs a control of receiving the first access code and the second access code from the portable terminal 100. The reception controller 202 is an example of a "first receiving unit". For example, the reception controller 202 receives the first access code and the second access code from the portable terminal 100 via the communication unit 203.

The determination unit 205 determines whether or not the first access code received from the portable terminal 100 is stored in the first storage unit 201. The determination unit 205 is an example of a "first determining unit". For example, when the first access code and the second access code are received by the reception controller 202 from the portable terminal 100, the determination unit 205 determines whether or not the received first access code is stored in the first storage unit 201. The determination unit 205 then notifies the transmission controller 206 of a result of the determination.

The transmission controller 206 performs a control of transmitting provision information to the portable terminal 100. The transmission controller 206 is an example of a "provision information transmitting unit". For example, when the first access code is determined to be stored in the first storage unit 201 by the determination unit 205, the transmission controller 206 obtains, from the second storage unit 204, provision information associated with the second access code received by the reception controller 202 from the portable terminal 100. The transmission controller 206 then transmits the obtained provision information to the portable terminal 100 via the communication unit 203.

Entire Processing According to First Embodiment

Figure 7:
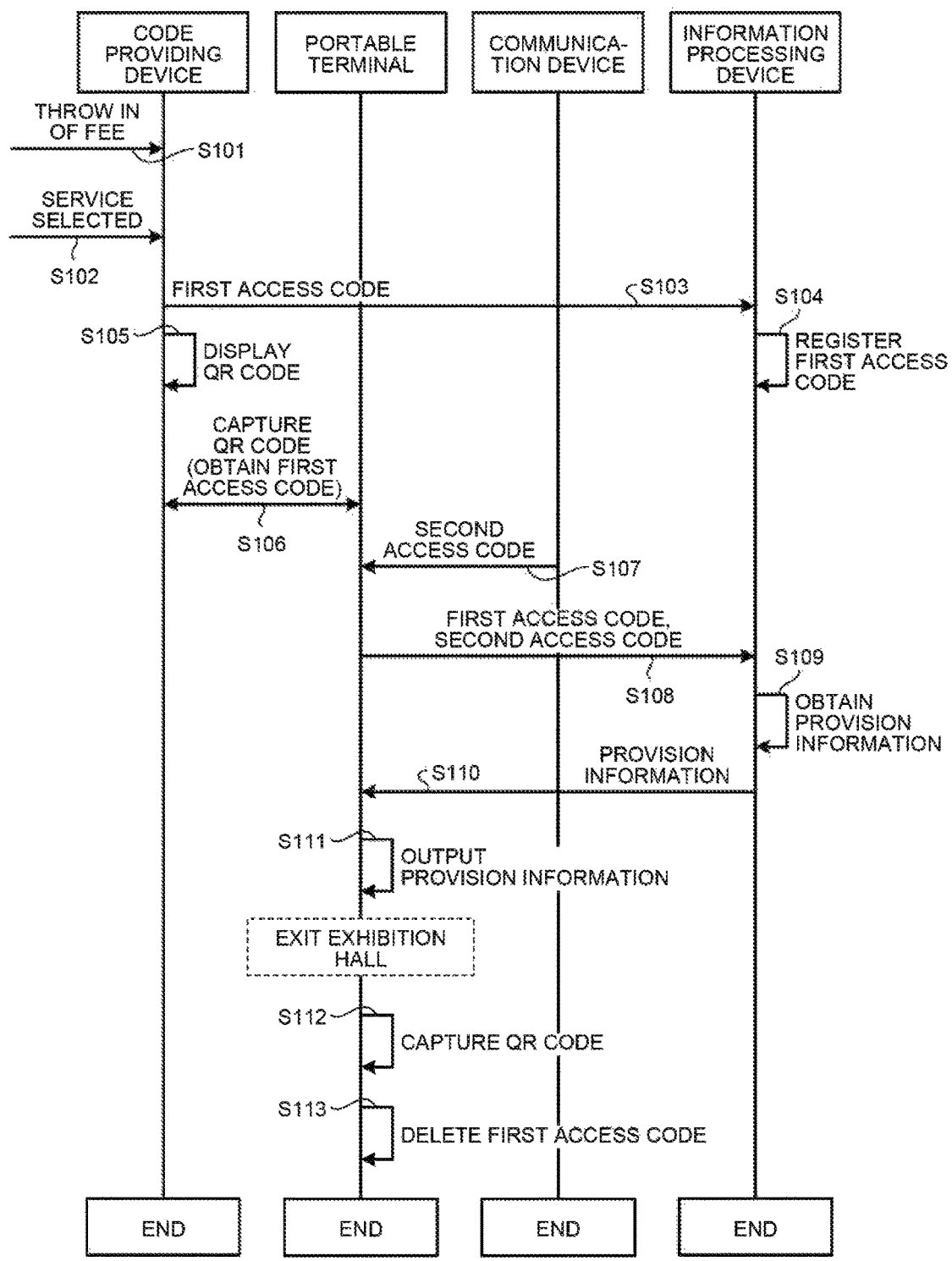
FIG. 7 is a sequence diagram of an example of a flow of an entire processing according to the first embodiment.

Next, a flow of an entire processing according to the first embodiment will be explained with reference to FIG. 7. FIG. 7 is a sequence diagram of an example of a flow of an entire processing according to the first embodiment.

As illustrated in FIG. 7, the code providing device 50 receives a throw in of a fee when a user enters the exhibition hall (step S101). The code providing device 50 also receives a selection on whether or not the user gets a service of the provision information (step S102). Here, the user is assumed to have made a selection of getting the service of the provision information. The code providing device 50 transmits the first access code included in the QR Code® to the information processing device 200 (step S103). When receiving the first access code from the code providing device 50, the information processing device 200 registers the received first access code in the first storage unit 201 (step S104).

The code providing device 50 displays the QR Code® including the first access code, the address of the information processing device 200, and the like (step S105). The portable terminal 100 captures an image of the QR Code® displayed by the code providing device 50 in accordance with an operation by the user (step S106). The portable terminal 100 thus obtains the first access code and the address of the information processing device 200.

After this, the user carrying the portable terminal 100 enters the exhibition hall and moves to an exhibition article around which the communication device 60 is arranged.

The communication device 60 transmits the second access code to the portable terminal 100 when the portable terminal 100 comes within its own communication range (step S107). When receiving the second access code from the communication device 60, the portable terminal 100 transmits the first access code obtained in the entry and the second access code received from the communication device 60 to the information processing device 200 in accordance with the address obtained in the entry (step S108).

When receiving the first access code and the second access code from the portable terminal 100, the information processing device 200 determines whether or not the received first access code is stored in the first storage unit 201 and obtains, from the second storage unit 204, the provision information associated with the received second access code when determining that the first access code is stored (step S109). The information processing device 200 then transmits the provision information obtained from the second storage unit 204 to the portable terminal 100 (step S110). When receiving the provision information from the information processing device 200, the portable terminal 100 outputs the received provision information (step S111). After this, the user carrying the portable terminal 100 moves to the exit gate to exit the exhibition hall.

The portable terminal captures an image of a QR Code® which is displayed in the display device and the like arranged in the vicinity of the exit gate and includes the information that invalidates the first access code in response to the operation by the user (step S112). The portable terminal 100 then deletes the first access code from the portable terminal 100 in response to the image capturing of the QR Code® including the information that invalidates the first access code (step S113).

In the information providing system 1, relevant provision information is provided based on the first access code obtained from the code providing device 50 in entering the exhibition hall and the second access code obtained from the communication device 60 arranged in the vicinity of an exhibition article, the portable terminal 100 is made to obtain the information that invalidates the first access code in exiting the exhibition hall, and the first access code is deleted from the portable terminal 100. As a result, it is possible in the information providing system 1 to make the information concerning the exhibition hall available only while the user stays in the exhibition hall.

Second Embodiment

System Configuration According to Second Embodiment

Figure 8:
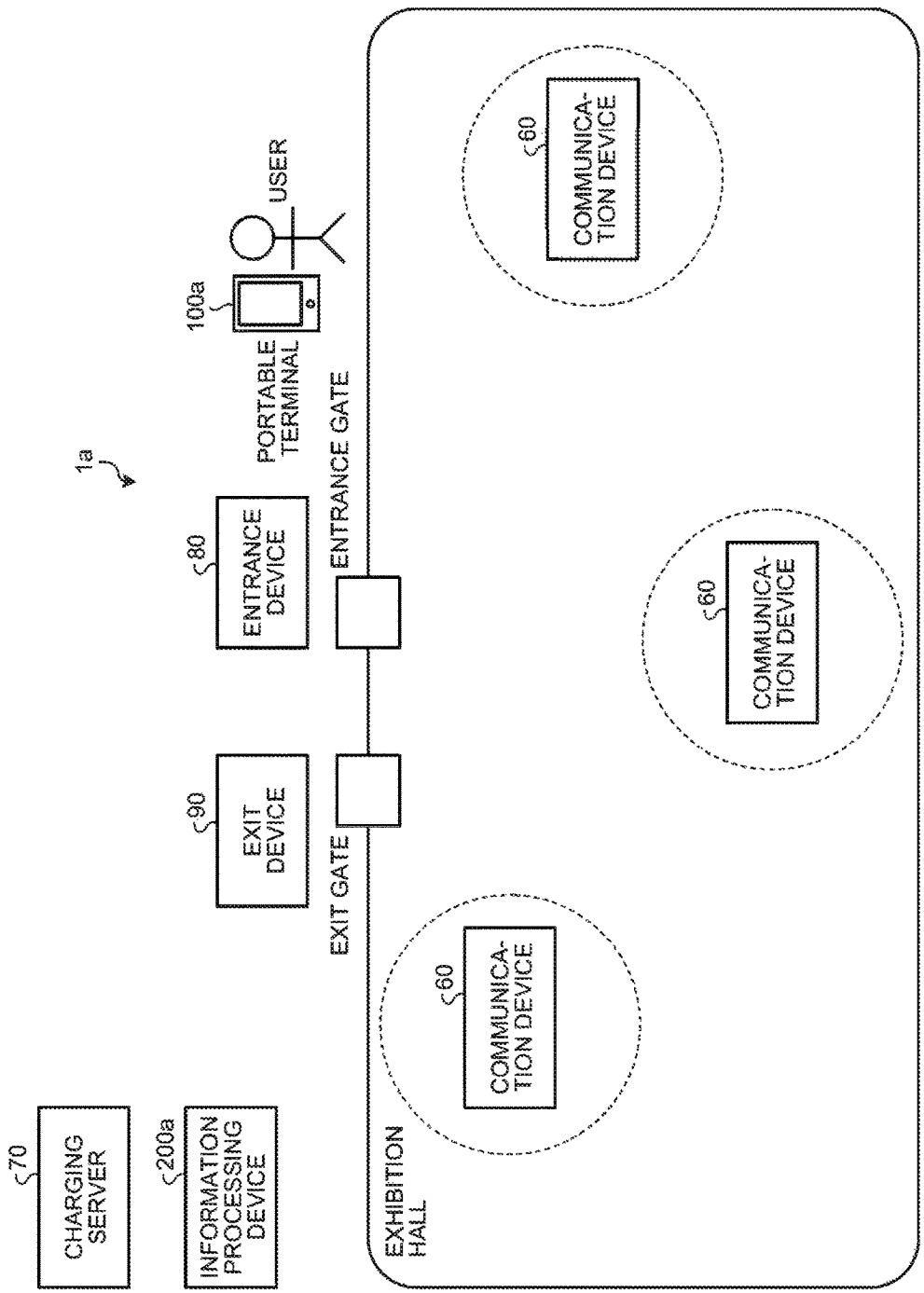
FIG. 8 illustrates an example of a configuration of an information providing system according to a second embodiment.

A configuration of an information providing system according to a second embodiment will be explained with reference to FIG. 8. FIG. 8 illustrates an example of a configuration of an information providing system according to the second embodiment.

As illustrated in FIG. 8, an information providing system 1a is provided with the communication device 60, a charging server 70, an entrance device 80, an exit device 90, a portable terminal 100a, and an information processing device 200a. The number of each of those devices is not limited to what is illustrated. The information providing system 1a is used in an exhibition hall such as a museum and an aquarium. A user who visits an exhibition hall carries the portable terminal 100a. In the exhibition hall, the communication devices 60 are arranged. An exhibition article is assumed to be present at a place where the communication device 60 is arranged. A range surrounded by a dash line around the communication device 60 indicates a valid area of a wireless communication such as the Bluetooth®.

The portable terminal 100a activates an application to be used in the exhibition hall in response to an operation by a user and transmits, to the information processing device 200a, information to the effect of starting to get a service of provision information. When receiving the information of starting the service, the information processing device 200a responds to the portable terminal 100a with the first access code. The information processing device 200a transmits charging information to the charging server 70 depending on the service. The charging server 70 manages charging information. When obtaining a first access code from the information processing device 200a, the portable terminal 100a generates information-embedded pattern including the first access code. The information-embedded pattern is a QR Code® and the like. The user operates the portable terminal 100a to display the QR Code® including the first access code in entering the exhibition hall through the entrance gate.

The entrance device 80, which is arranged in the vicinity of the entrance gate of the exhibition hall, controls to open the entrance gate and includes an image capturing unit that captures an image of the information-embedded pattern. The information-embedded pattern is a QR Code® and the like. The first access code is included in the QR Code® whose image is to be captured by the entrance device 80. In other words, the user operates the portable terminal 100a to display the QR Code® including the first access code and causes the QR Code® to be captured by the entrance device 80. The entrance device 80 thereby obtains the first access code by the image capturing of the QR Code®.

The entrance device 80 having obtained the first access code requests the information processing device 200a to determine the presence/absence of the first access code. The information processing device 200a refers to the first access code stored in itself to determine the presence/absence of the first access code in response to the request from the entrance device 80. The information processing device 200a instructs the entrance device 80 to perform a control of opening the entrance gate when the stored first access code corresponds. The entrance device 80 thus executes a control of opening the entrance gate.

When the entrance gate is opened, the user enters the exhibition hall.

The user having entered the exhibition hall moves to a place where an exhibition article is present. At the place where the exhibition article is present, the communication device 60 is arranged. When the portable terminal 100a comes within the communication range of the communication device 60, the communication device 60 transmits a second access code, which is different from the first access code, to the portable terminal 100a. When receiving the second access code, the portable terminal 100a transmits, to the information processing device 200a, the first access code obtained from the information processing device 200a and the second access code received from the communication device 60.

The information processing device 200a stores the first access code, and stores in advance second access codes and pieces of provision information corresponding the respective pieces of provision information. When receiving the first access code and the second access code from the portable terminal 100a, the information processing device 200a determines whether or not the received first access code is stored in the storage unit. The information processing device 200a obtains provision information associated with the second access code from the storage unit when the first access code is stored in the storage unit. The information processing device 200a then transmits the obtained provision information to the portable terminal 100a.

When receiving the provision information from the information processing device 200a, the portable terminal 100a outputs the provision information to the display unit and the like. In this manner, provision information concerning each exhibition article is provided whenever the portable terminal 100a comes within the communication range of the communication device 60. After this, the user exits the exhibition hall through the exit gate. In the exit, the user operates the portable terminal 100a to display the QR Code® including the first access code.

The exit device 90, which is arranged in the vicinity of the exit gate of the exhibition hall, controls to open the exit gate and includes an image capturing unit that captures an image of an information-embedded pattern. The information-embedded pattern is a QR Code® and the like. The first access code is included in the QR Code® to be imaged by the exit device 90. In other words, the user operates the portable terminal 100a to display the QR Code® including the first access code and causes the QR Code® to be captured by the exit device 90. The exit device 90 thus obtains the first access code by the image capturing of the QR Code®.

The exit device 90 having obtained the first access code requests the information processing device 200a to delete the first access code. The information processing device 200a deletes the first access code which is stored in itself and corresponds to the first access code as a target of the deletion requested by the exit device 90 from the storage unit. The information processing device 200a instructs the exit device 90 to perform a control of opening the exit gate after deleting the first access code.

The exit device 90 thus executes the control to open the exit gate. When the exit gate is opened, the user exits the exhibition hall.

In the information providing system 1a, the portable terminal 100a is made to generate and display the QR Code® including the first access code obtained from the information processing device 200a, the entrance device 80 is made to capture the image of the QR Code® and executes the control to open the entrance gate when the first access code obtained by the image capturing corresponds to the first access code stored in the information processing device 200a. Besides, in the information providing system 1a, the first access code which is stored in the information processing device 200a and corresponds to the first access code obtained by the image capturing by the exit device 90 is deleted and the control of opening the exit gate is executed in response to the deletion. As a result, it is possible in the information providing system 1 to make information concerning the exhibition hall available only while the user stays in the exhibition hall.

Functional Configuration of Each Device According to Second Embodiment

Figure 9:
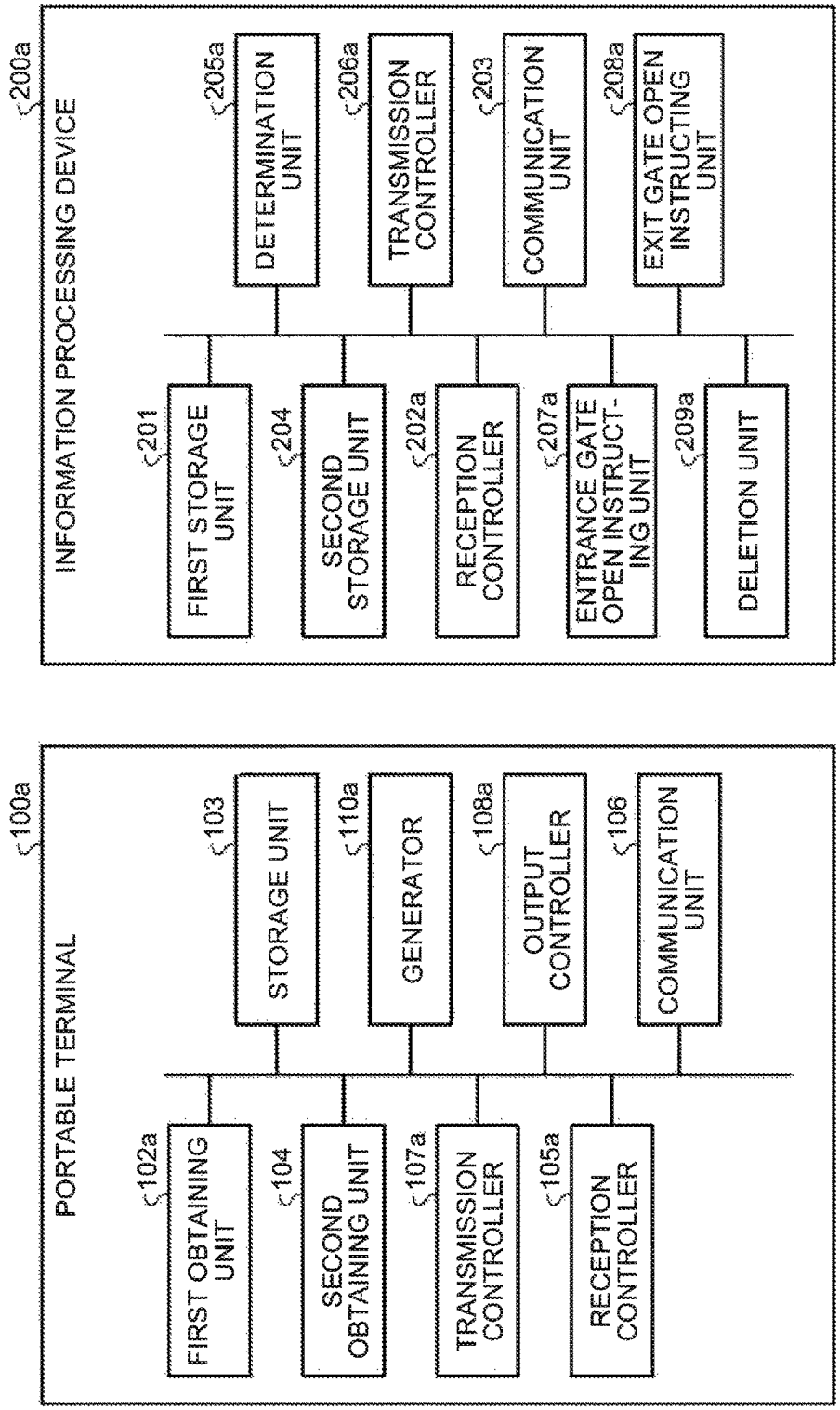
FIG. 9 is a block diagram of an example of a functional configuration of a portable terminal and an information processing device according to the second embodiment.

Next, a functional configuration of the portable terminal 100a and the information processing device 200a according to the second embodiment will be explained with reference to FIG. 9. FIG. 9 is a block diagram of an example of a functional configuration of the portable terminal 100a and the information processing device 200a according to the second embodiment. In FIG. 9, the same function as the functional configuration of each device according to the first embodiment is assigned with the same reference symbol.

As illustrated in FIG. 9, the portable terminal 100a is provided with a first obtaining unit 102a, the storage unit 103, the second obtaining unit 104, a reception controller 105a, the communication unit 106, a transmission controller 107a, an output controller 108a, and a generator 110a. A part or all of the first obtaining unit 102a, the second obtaining unit 104, the reception controller 105a, the transmission controller 107a, the output controller 108a, and the generator 110a may be realized by software (program) or may be realized by hardware.

The transmission controller 107a transmits information to the effect of using a service to the information processing device 200a via the communication unit 106 in response to an activation of an application for using the service of provision information or the reception of the selection of the service. The reception controller 105a thus receives the first access code from the information processing device 200a via the communication unit 106. The first obtaining unit 102a obtains the first access code obtained by the reception controller 105a.

The generator 110a generates an information-embedded pattern including the first access code. The information-embedded pattern is a QR Code® and the like. For example, the generator 110a generates a QR Code® including the first access code obtained by the first obtaining unit 102a from the information processing device 200a. For the generation of the QR Code®, known techniques may be used.

The output controller 108a performs a control of displaying information-embedded pattern. The output controller 108a is an example of the "display unit". For example, the output controller 108a displays the QR Code® which includes the first access code and is generated by the generator 110a in the operation display unit 16 and the like depending on the operation by the user. The user operates the portable terminal 100a to display the QR Code® to cause the QR Code® to be imaged by the entrance device 80 in the entry through the entrance gate. The QR Code® is captured by the entrance device 80, so that the entrance device 80 obtains the first access code. The entrance device 80 then transmits the obtained first access code to the information processing device 200a.

The user operates the portable terminal 100a to display the QR Code® to cause the QR Code® to be captured by the exit device 90 in the exit through the exit gate. The QR Code® is captured by the exit device 90, so that the exit device 90 obtains the first access code. The exit device 90 then requests the information processing device 200a to delete the first access code which corresponds to the obtained first access code and is stored in the information processing device 200a.

As illustrated in FIG. 9, the information processing device 200a is provided with the first storage unit 201, a reception controller 202a, the communication unit 203, the second storage unit 204, a determination unit 205a, a transmission controller 206a, an entrance gate open instructing unit 207a, an exit gate open instructing unit 208a, and a deletion unit 209a. A part or all of the reception controller 202a, the determination unit 205a, the transmission controller 206a, the entrance gate open instructing unit 207a, the exit gate open instructing unit 208a, and the deletion unit 209a may be realized by software (program) or may be realized by a hardware circuit.

The reception controller 202a receives the first access code from the entrance device 80. The reception controller 202a is an example of the "second receiving unit". For example, the reception controller 202a receives the first access code from the entrance device 80 via the communication unit 203. The reception controller 202a then notifies the determination unit 205a of the received first access code.

The determination unit 205a determines whether or not the first access code received from the entrance device 80 is stored in the first storage unit 201. The determination unit 205a is an example of the "second determining unit". For example, the determination unit 205a determines whether or not the first access code received from the entrance device 80 is stored in the first storage unit 201 and notifies the entrance gate open instructing unit 207a of a result of the determination.

The entrance gate open instructing unit 207a instructs the entrance device 80 to open the entrance gate. For example, when the first access code received from the entrance device 80 is determined by the determination unit 205a to be stored in the first storage unit 201, the entrance gate open instructing unit 207a instructs the entrance device 80 to open the entrance gate via the communication unit 203. The entrance device 80 thus controls to open the entrance gate. The user then becomes able to enter the exhibition hall.

The reception controller 202a receives a request for deleting the first access code from the exit device 90. The reception controller 202a is an example of a "third receiving unit". For example, the reception controller 202a receives the first access code and the request for deleting the first access code from the exit device 90 via the communication unit 203. The reception controller 202a notifies the deletion unit 209a of the received first access code.

The deletion unit 209a deletes the first access code from the first storage unit 201. The deletion unit 209a is an example of an "information code deleting unit". For example, when the request for deleting the first access code from the exit device 90 is received by the reception controller 202a, the deletion unit 209a deletes the first access code from the first storage unit 201.

The exit gate open instructing unit 208a instructs the exit device 90 to open the exit gate. For example, when the first access code is deleted by the deletion unit 209a from the first storage unit 201, the exit gate open instructing unit 208a instructs the exit device 90 to open the exit gate via the communication unit 203. The exit device 90 thus controls to open the exit gate. The user then becomes able to exit the exhibition hall.

Entire Processing According to Second Embodiment

Figure 10:
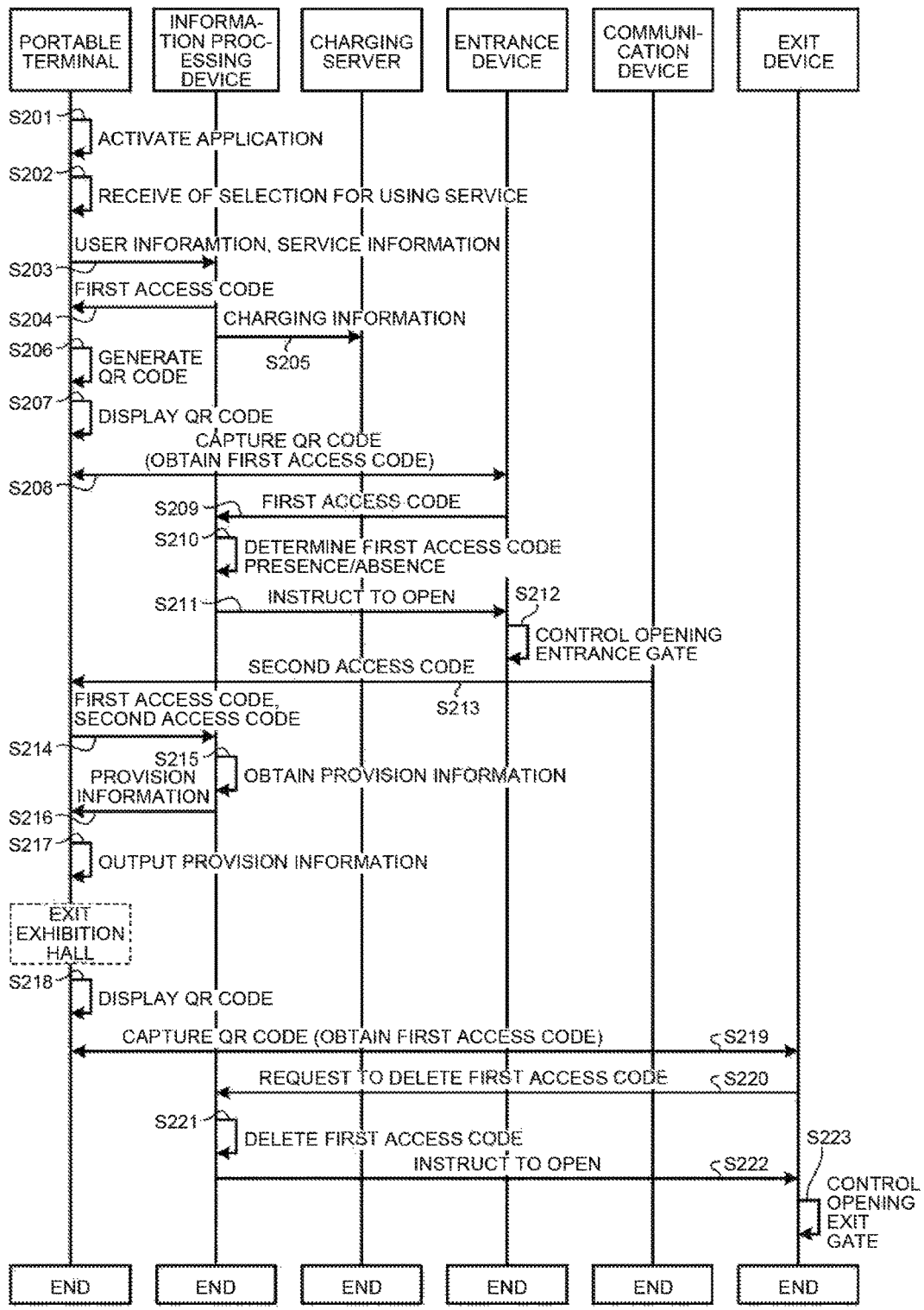
FIG. 10 is a sequence diagram of an example of a flow of an entire processing according to the second embodiment.

Next, a flow of an entire processing according to the second embodiment will be explained with reference to FIG. 10. FIG. 10 is a sequence diagram of an example of a flow of an entire processing according to the second embodiment.

As illustrated in FIG. 10, the portable terminal 100a receives an operation, by the user, of activating an application for using a service of getting provision information (step S201). The portable terminal 100a then receives a selection of a service to use after the activation of the application (step S202). The portable terminal 100a then transmits user information and service information concerning the selected service (information to the effect of using the service) to the information processing device 200a (step S203).

When receiving the information to the effect of using the service from the portable terminal 100a, the information processing device 200a transmits the first access code to the portable terminal 100a (step S204). The information processing device 200a transmits the user information and charging information to the charging server 70 depending on the service to use (step S205). When receiving the first access code from the information processing device 200a, the portable terminal 100a generates a QR Code® including the received first access code (step S206). The portable terminal 100a then displays the generated QR Code® (step S207).

The entrance device 80 captures an image of the QR Code® displayed by the portable terminal 100a to obtain the first access code included in the QR Code® (step S208).

The entrance device 80 then transmits the obtained first access code to the information processing device 200a (step S209). When receiving the first access code from the entrance device 80, the information processing device 200a determines the presence/absence of the first access code by determining whether or not the received first access code is stored in the first storage unit 201 (step S210). Here, the first access code received form the entrance device 80 is assumed to be stored in the first storage unit 201. The information processing device 200a then instructs the entrance device 80 to open the entrance gate (step S211).

When receiving the instruction to open the entrance gate from the information processing device 200a, the entrance device 80 controls to open the entrance gate (step S212).

The user thus enters the exhibition hall through the entrance gate and moves to an exhibition article around which the communication device 60 is arranged.

The communication device 60, when the portable terminal 100a comes within the communication range of oneself, transmits the second access code to the portable terminal (step S213). When receiving the second access code from the communication device 60, the portable terminal 100a transmits the first access code obtained from the information processing device 200a and the second access code received from the communication device 60 to the information processing device 200a (step S214).

When receiving the first access code and the second access code from the portable terminal 100a, the information processing device 200a determines whether or not the received first access code is stored in the first storage unit 201 and obtains provision information associated with the received second access code from the second storage unit 204 when determining that the received first access code is stored (step S215). The information processing device 200a then transmits the provision information obtained from the second storage unit 204 to the portable terminal 100a (step S216). When receiving the provision information from the information processing device 200a, the portable terminal 100a outputs the received provision information (step S217). After this, the user carrying the portable terminal 100a moves to the exit gate to exit the exhibition hall.

The portable terminal 100a displays the generated QR Code® depending on the operation by the user (step S218). The exit device 90 captures an image of the QR Code® displayed by the portable terminal 100a and obtains the first access code included in the QR Code® (step S219). The exit device 90 then transmits, to the information processing device 200a, the request for deleting the first access code together with the first access code obtained by the image capturing (step S220). When receiving the request for deleting the first access code from the exit device 90, the information processing device 200a deletes the relevant first access code stored in the first storage unit 201 (step S221). The information processing device 200a then instructs the exit device 90 to open the exit gate (step S222). When receiving the instruction to open the exit gate from the information processing device 200a, the exit device 90 controls to open the exit gate (step S223). The user thereby exits through the exit gate.

In the information providing system 1a, the portable terminal 100a is made to generate and display the information-embedded pattern including the first access code obtained from the information processing device 200a, and the entrance device 80 is made to image the information-embedded pattern to perform a control of opening the entrance gate depending on the presence/absence of the obtained first access code. Besides, in the information providing system 1a, the exit device 90 is made to image the information-embedded pattern to delete the obtained first access code and control to open the exit gate. As a result, it is possible in the information providing system 1a to make the information concerning the exhibition hall available only while the user stays in the exhibition hall.

Third Embodiment

While embodiments of the information providing system 1 according to the present invention are explained so far, the invention may be implemented in various forms different from the above-explained embodiments. So, a different embodiment as for (1) Output and notification of provision information, (2) Additional information, (3) Configuration, and (4) Programs will be explained.

(1) Output and Notification of Provision Information

It is possible in a third embodiment to limit conditions that allow an output of provision information by the portable terminal 100. For example, the portable terminal 100 confirms a connection with the communication device 60 and outputs provision information while the connection with the communication device 60 is confirmed. The function of the portable terminal 100 is an example of a "connection confirming unit" and a "provision information output unit". In other words, the portable terminal 100 outputs the provision information concerning an exhibition article in the vicinity of the communication device 60 only while being within the communication range of the communication device 60.

In the third embodiment, the provision information to be transmitted by the information processing device 200 may be transmitted depending on time. For example, the information processing device 200 is provided with a storage unit that stores provision information concerning a venue of an exhibition article, positional information of the exhibition article, a notification time indicating a time of notifying the provision information in advance, and communication identifying information that identifies a communication device 60 corresponding to the exhibition article, in association with each other. The storage unit is an example of a "third storage unit". When the notification time comes, the information processing device 200 transmits the provision information to the portable terminal 100 locating within a predetermined range including the positional information. Therefore, the information processing device 200 obtains the positional information of each portable terminal 100 from each portable terminal 100 and determines the portable terminal 100 to which the provision information is to be provided. The function of the information processing device 200 is an example of a "prior transmission unit".

FIG. 11 illustrates an example of information stored in the third storage unit according to the third embodiment. As illustrated in FIG. 11, the third storage unit stores, by associating with each other, the provision information concerning the venue of the exhibition article, a venue position indicating positional information of the exhibition article, a start time of the exhibition article, an end time of the exhibition article, a notification time indicating a time of a prior notification, a notification method indicating a method of the prior notification, and notification target information indicating communication identifying information that identifies the communication device 60 arranged in the vicinity of the exhibition article. To cite an instance, the third storage unit stores, by associating with each other, provision information "AUDIO INFORMATION (EVENT A)", a venue position "(A, A)", a start time "10:00", an end time "12:00", a notification time "9:30", and a notification target "Bt001, Bt003".

For example, the provision information "AUDIO INFORMATION (EVENT A)" is notified to the portable terminal 100 in the vicinity of the venue position "(A, A)" thirty minutes before the start time as for the "EVENT A" illustrated in FIG. 11. Provision information may be notified via the communication device 60 and provision information may be notified via communication devices 60 (Bt001 and Bt003) each as a notification target, for example. On this occasion, positional information of each portable terminal 100 may not be obtained. In other words, the provision information is notified to the portable terminal 100 included in the communication range of the communication devices (Bt001 and Bt003). The user recognizes the fact that it becomes thirty minutes before the start time as for the EVENT A. As a notification target, a communication device 60 at a position at which the user is able to arrive before the start time is assumed to be determined based on a travelling time to visit the event to be held. Therefore, there is a possibility that provision information of different events is notified to one portable terminal 100 when there are some events whose start time is the same, for example.

Figures 12, 13:
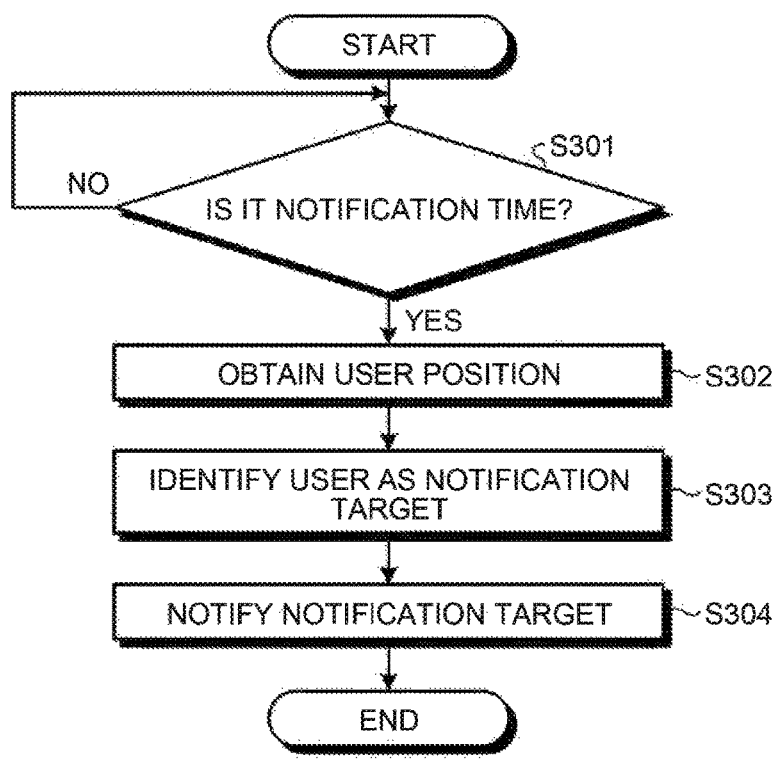
FIG. 12 is a flowchart of an example of a flow of a prior notification processing according to the third embodiment.
FIG. 13 illustrates an example of information stored in a history storage unit according to the third embodiment.

FIG. 12 is a flowchart of an example of a flow of a prior notification processing according to the third embodiment. As illustrated in FIG. 12, when a notification time of a certain event comes ("Yes" at step S301), the information processing device 200 obtains positional information from each portable terminal 100 (step S302). On the other hand, when it is not the notification time yet ("No" at step S301), the information processing device 200 stands ready until the notification time. The information processing device 200 identifies a user who is able to reach before the start time, i.e., a portable terminal 100 as a notification target of the provision information based on the venue position of the event (step S303). The information processing device 200 then notifies the identified portable terminal 100 of the provision information (step S304).

In the third embodiment, a history of an exhibition article visited by the user may be notified in providing the provision information. For example, when receiving the first access code and the second access code from the portable terminal 100, the information processing device 200 registers, as a history by associating with each other, user information of the user carrying the portable terminal 100, the first access code, the second access code, and communication identifying information that identifies the communication device that provides the second access code in a history storage unit. The function of the information processing device 200 is an example of a "history registering unit". The information processing device 200 refers to the history storage unit and transmits visit history information of exhibition articles visited by the user together with the provision information. The function of the information processing device 200 is an example of the "provision information transmitting unit".

FIG. 13 illustrates an example of information stored in the history storage unit according to the third embodiment. As illustrated in FIG. 13, the history storage unit stores, by associating with each other, the user information, the first access code, the second access code, and an access point indicating communication identifying information of the communication device arranged in the vicinity of the exhibition article visited by the user. To cite an instance, the history storage unit stores, by associating with each other, user information "USER A", the first access code "1AC001", the second access code "2AC001", and access points "Bt001, Bt002". For example, since the user A has already visited two exhibition articles (exhibition articles in the vicinity of communication devices 60 "Bt001 and Bt002"), the information processing device 200 notifies the portable terminal 100 of the already-visited point.

In the third embodiment, an exhibition article which has not been visited by the user may be notified in exiting.

For example, when instructing the exit device 90 to open the exit gate, the information processing device 200 refers to the history storage unit, generates information that notifies an exhibition article not visited by the user, and transmits the generated information to the portable terminal 100. The function of the information processing device 200 is an example of a "generated information transmitting unit". In other words, the information processing device 200 identifies an exhibition article which has not been visited by the user based on access point information included in the history information, generates information indicating that the identified exhibition article has not been visited, and transmits the information to the portable terminal 100. It is thereby possible to promote a next visit.

(2) Additional Information

It is possible in the third embodiment to provide additional information by arranging an information-embedded pattern in the vicinity of an exhibition article and imaging the information-embedded pattern. The user uses the portable terminal 100 to capture an image of the information-embedded pattern such as the QR Code® arranged in the vicinity of the exhibition article. Additional information, different from the provision information, concerning the exhibition article is configured to be included in the QR Code®.

(3) Configuration

The processing procedure, the control procedure, the specific names, and information including data and parameters of various kinds explained in the specification and illustrated in the drawings may be arbitrarily changed unless otherwise specified. Each of constituents of the illustrated devices is conceptually illustrated in function and is not necessarily required to be configured physically as illustrated in the drawings. In other words, a specific form of disintegration and integration of each device is not limited to what is illustrated in the drawings and a part or all thereof may be disintegrated or integrated functionally or physically by an arbitrary unit depending on loads and usage conditions of various kinds.

While the example of arranging the charging server 70 is taken as an example in the third embodiment, it is possible to appropriately change to a configuration of charging depending on the number of visited exhibition articles (the number of communication devices 60) as for the charging.

(4) Programs

Programs to be executed in the portable terminal 100 and the information processing device 200 according to an embodiment may be provided by being recorded in a file of an installable format or of an executable format in a computer-readable recording medium such as a CD-ROM, a flexible disk (FD), a CD-R, and a DVD (Digital Versatile Disk) as a computer program product. The programs to be executed in the portable terminal 100 and the information processing device 200 may be stored on a computer connected to a network such as the Internet and provided by being downloaded via the network. The programs to be executed in the portable terminal 100 and the information processing device 200 may be provided or distributed via a network such as the Internet. The programs to be executed in the portable terminal 100 and the information processing device 200 may be provided by being preloaded in a ROM and the like.

The programs to be executed in the portable terminal 100 have a module configuration including the units explained above (the first obtaining unit 102, the second obtaining unit 104, the reception controller 105, the transmission controller 107, the output controller 108, and the deletion unit 109) and, as an actual hardware, the units are configured to be loaded on a main storage device to generate on the main storage unit the first obtaining unit 102, the second obtaining unit 104, the reception controller 105, the transmission controller 107, the output controller 108, and the deletion unit 109 when the CPU reads out from a storage medium and execute the programs.

The programs to be executed in the information processing device 200 have a module configuration including the units explained above (the reception controller 202, the determination unit 205, and the transmission controller 206) and, as an actual hardware, the units are configured to be loaded on a main storage device to generate on the main storage unit the reception controller 202, the determination unit 205, and the transmission controller 206 when the CPU reads out from a storage medium and execute the programs.

According to the embodiments, provision information is available only while a user stays in a specific area such as an exhibition hall.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information providing method to he executed in an information providing system including a portable terminal and an information processing device, the information providing method comprising:

obtaining, by the portable terminal, a first code used to obtain provision information;

obtaining, by the portable terminal, a second code from a communication device arranged in a specific area, the second code being different from the first code;

transmitting, by the portably terminal, the first code and the second code to the information processing device;

receiving, by the information processing device, the first code and the second code from the portable terminal, the information processing device including:
 a first storage configured to store the first code,
 a second storage configured to store the second code and the provision information in association with each other, and
 a third storage configured to store the provision information, positional information of an exhibition article, and a notification time indicating a time of notifying the provision information in advance, in association with each other;

determining, by the information processing device, whether the first code received from the portable terminal is stored in the first storage;

obtaining, by the information processing device when the first code is determined to be stored in the first storage, the provision information stored in the second storage and that is associated with the second code received from the portable terminal;

transmitting, by the information processing device, the provision information and the position information to the portable terminal when the portable terminal is within a predetermined range and the notification time is reached;

receiving, by the portable terminal, the provision information from the information processing device in response to the transmitting the first code and the second code; and outputting, by the portable terminal, the received provision information.

2. The information providing method according to claim 1, further comprising:
   capturing, by the portable terminal, an image of an information-embedded pattern; and
   deleting, by the portable terminal, the first code from the portable terminal depending on the image capturing of the information-embedded pattern including information that invalidates the first code, wherein
   the first code is obtained depending on the image capturing of the information-embedded pattern including the first code.

3. The information providing method according to claim 1, further comprising:
   generating, by the portable terminal, an information-embedded pattern including the first code; and
   displaying, by the portable terminal, the information-embedded pattern, the first code being obtained from the information processing device;
   capturing, by the information processing device, a first image of the information-embedded pattern displayed by the portable terminal;
   receiving, by the information processing device, the first code from an entrance device that controls to open an entrance gate of the specific area;
   determining, by the information processing device, whether the first code received from the entrance device is stored in the first storage;
   instructing, by the information processing device, the entrance device to open the entrance gate when the first code is determined to be stored in the first storage;
   capturing, by the information processing device, a second image of the information-embedded pattern displayed by the portable terminal;
   receiving, by the information processing device, a request for deleting the first code from an exit device that controls to open an exit gate of the specific area;
   deleting, by the information processing device when receiving the deletion request from the exit device, the first code from the first storage; and
   instructing, by the information processing device, the exit device to open the exit gate when the first code is deleted from the first storage.

4. The information providing method according to claim 1, further comprising:
   confirming, by the portable terminal, a connection with the communication device; and
   outputting, by the portable terminal, the provision information while the connection with the communication device is confirmed.

5. The information providing method according to claim 1, further comprising:
   registering, by the information processing device in a history storage, by associating as a history, user information of a user that carries the portable terminal, the first code, the second code, and communication identifying information that identifies the communication device that provides the second code when the first code and the second code are received from the portable terminal; and
   referring to, by the information processing device, the history storage and further transmitting visit history information of an exhibition article visited by the user.

6. The information providing method according to claim 3, further comprising:
   registering, by the information processing device in a history storage, by associating as a history, user information of a user that carries the portable terminal, the first code, the second code, and communication identifying information that identifies the communication device that provides the second code when the first code and the second code are received from the portable terminal; and
   referring to, by the information processing device, the history storage to generate information of notifying an exhibition article not visited by the user, and transmitting the information to the portable terminal when the exit device is instructed to open the exit gate.

* * * * *